United States Patent [19]
Heck et al.

[11] Patent Number: 5,301,118
[45] Date of Patent: Apr. 5, 1994

[54] MONTE CARLO SIMULATION DESIGN METHODOLOGY

[75] Inventors: Howard L. Heck, Endicott; John S. Kresge, Binghamton, both of N.Y.

[73] Assignee: International Business Machines Corporation, Armonk, N.Y.

[21] Appl. No.: 793,981

[22] Filed: Nov. 18, 1991

[51] Int. Cl.⁵ .............................................. G06F 15/46
[52] U.S. Cl. ................................. 364/468; 364/552; 364/554; 364/578; 364/491
[58] Field of Search ............... 364/468, 552, 554, 559, 364/578, 560, 551.01, 551.02, 550, 474.24, 149–151, 152–156, 488–491

[56] References Cited

U.S. PATENT DOCUMENTS

| | | | |
|---|---|---|---|
| 4,831,741 | 5/1989 | Sogoian | 364/552 X |
| 4,908,782 | 3/1990 | Pekarer et al. | 364/560 |
| 4,918,627 | 4/1990 | Garcia et al. | 364/474.24 X |
| 5,047,947 | 9/1991 | Stump | 364/468 |
| 5,047,966 | 9/1991 | Crow et al. | 364/560 |

FOREIGN PATENT DOCUMENTS 0317539  5/1989  European Pat. Off. .

OTHER PUBLICATIONS

"Six Sigma Mechanical Design Tolerancing" Motorola, Inc. 1988.
"Optimizing Component & Assembly Tolerancing", 1986–ASQC Quality Congress Transactions.
"Predicting Dimensional Variation In Complex Assemblies" Cadence, Jul. 1989, pp. 59–61.
"Avoiding Assembly Misfits", Manufacturing Engineering, Jun. 1990, pp. 53–55.

*Primary Examiner*—Joseph Ruggiero
*Attorney, Agent, or Firm*—Richard M. Goldman

[57] ABSTRACT

A two-stage Monte Carlo method of tolerancing components of an assembly is provided. Statistical measures of component features are not time invariant, but change over a production run. That is, the mean value of component feature measures and the standard distribution of the component feature measures about the time dependent mean are not invariant over a production run, but shift with time and throughput. According to the invention, these "shifted" or "adjusted" parameters are utilized in a Monte Carlo simulation to determine discrete values for the individual points of each output distribution, $x(i)$, $y(i)$, $z(i)$. The individual points of the output distributions, $x(i)$, $y(i)$, $z(i)$, are combined in a second Monte Carlo simulation step for individual assembly final fit $F(x(i), y(i), z(i))$. The statistics of the individual assembly final fits are then compared to manufacturing specifications.

2 Claims, 6 Drawing Sheets

| FEATURE | SHIFT | DIMENSION | $C_p$ | $C_{pk}$ |
|---|---|---|---|---|
| E | DYNAMIC | $3000 \pm 300$ N/mm$^2$ | 1.33 | 1.0 |
| t | STATIC, V = +1 | $1.1 \pm 0.05$ mm | 2.0 | 1.5 |
| D | STATIC, V = −1 | $11.0 \pm 0.13$ mm | 2.0 | 1.5 |
| d | STATIC, V = +1 | $7.6 \pm 0.13$ mm | 2.0 | 1.5 |
| D | STATIC, V = −1 | $7.27 \pm 0.05$ mm | 2.0 | 1.5 |
| A | DYNAMIC | $4.0 \pm 0.02$ mm | 1.5 | 1.0 |
| B | DYNAMIC | $3.7 \pm 0.13$ mm | 1.0 | 0.5 |

SUMMARY OF INPUT TO MONTE CARLO SIMULATION.

FIG. 6

| FEATURE | $\mu$ | $\sigma$ | LOW | HIGH |
|---|---|---|---|---|
| E [N/mm$^2$] | 3299.5 | 99.89 | 2917.9 | 3696.7 |
| t [mm] | 1.112 | 0.0083 | 1.079 | 1.142 |
| D [mm] | 10.968 | 0.0217 | 10.878 | 11.051 |
| d [mm] | 7.633 | 0.0213 | 7.554 | 7.708 |
| C [mm] | 7.258 | 0.0085 | 7.227 | 7.289 |
| A [mm] | 4.000 | 0.0068 | 3.975 | 4.026 |
| B [mm] | 3.701 | 0.0871 | 3.351 | 4.020 |
| P [N] | 18.876 | 3.885 | 3.613 | 33.879 |

SUMMARY OF OUTPUT TO MONTE CARLO SIMULATION.

MONTE CARLO SIMULATION DESIGN METHODOLOGY

FIELD OF THE INVENTION

The invention relates to tolerancing parameters of systems, such as components of an assembly, or the resistances, capacitances, and inductances of circuit elements, or even the speeds of the memory chips in a memory. More particularly, the invention builds from the recognition that the statistical measures of component features are not time invariant, but change over a production run. That is, the mean value of component feature measures and the standard deviation of the component feature measures about the time dependent mean do not remain static over a production run or even from run to run. The measures of product feature size, that is, the mean, the standard deviation, and the process capability index, all shift over time. The mean and the standard deviation, and through them the product capability, are mathematically "shifted" or "adjusted" to account for this change in feature dimensions over time.

According to the invention, these "shifted" or "adjusted" parameters are utilized in a Monte Carlo simulation to determine discrete values for the individual points of each output distribution, $x(i)$, $y(i)$, $z(i)$. In a subsequent Monte Carlo simulation step, the individual points of the output distributions, $x(i)$, $y(i)$, $z(i)$, are combined for individual assembly final fit. The statistics of the individual assembly final fits are then compared to manufacturing specifications.

The final fit distribution for the assembled components is a variable modelled by a function $F$. $F$ is a function, $F[x,y,z]$, of the dimension distributions of the individual components $x$, $y$, and $z$. The distribution of $F$ is given by Monte Carlo simulation of the function $$F(i) = F[x(i), y(i), z(i)].$$

where the distribution is modelled by direct substitution That is, the distribution $F$ is modelled by the direct substitution.

$$F(1) = F[x(1), y(1), z(1)].$$
$$F(2) = F[x(2), y(2), z(2)].$$
$$\ldots$$
$$F(i) = F[x(i), y(i), z(i)],$$
$$\ldots, \text{and}$$
$$F(n) = F[x(n), y(n), z(n)].$$

BACKGROUND OF THE INVENTION

1. Electronic Circuit Packages

The general structures and manufacturing processes for electronic packages, including the use of positive photoresists in the fabrication of electronic packages, are described in, for example, Donald P. Seraphim, Ronald Lasky, and Che-Yo Li, *Principles of Electronic Packaging*, McGraw-Hill Book Company, New York, New York, (1988), and Rao R. Tummala and Eugene J. Rymaszewski, *Microelectronic Packaging Handbook*, Van Nostrand Reinhold, New York, N.Y. (1988), both of which are hereby incorporated herein by reference.

As described by Seraphim et al., and Tummala et al., an electronic circuit contains many individual electronic circuit components, e.g., thousands or even millions of individual resistors, capacitors, inductors, diodes, and transistors. These individual circuit components are interconnected to form the circuits, and the individual circuits are further interconnected to form functional units. Power and signal distribution are done through these interconnections. The individual functional units require mechanical support and structural protection. The electrical circuits require electrical energy to function, and the removal of thermal energy to remain functional. Microelectronic packages, such as, chips, modules, circuit cards, circuit boards, and combinations thereof, are used to protect, house, cool, and interconnect circuit components and circuits.

Within a single integrated circuit, circuit component to circuit component and circuit to circuit interconnection, heat dissipation, and mechanical protection are provided by an integrated circuit chip. This chip is referred to as the "zeroth" level of packaging, while the chip enclosed within its module is referred to as the first level of packaging.

There is at least one further level of packaging. The second level of packaging is the circuit card. A circuit card performs at least four functions. First, the circuit card is employed because the total required circuit or bit count to perform a desired function exceeds the bit count of the zeroth and first level packages, i.e., the chip and chip modules. Second, the circuit card provides for signal interconnection with other circuit elements. Third, the second level package, i.e., the circuit card, provides a site for components that are not readily integrated into the first level package, i.e., the chip or module. These components include, e.g., capacitors, precision resistors, inductors, electromechanical switches, optical couplers, and the like. Fourth, attachment to the second level package provides for thermal management of the chip and module, i.e., heat dissipation. The primary purpose of the package remains electrical interconnection.

2. Packaging Density and Manufacturing Tolerances

Historically, the package has not been the determinant of system performance. However, rapid advances in integrated circuit development have led to a reversal of roles. Thus, H. P. Bakoglu, *Circuits, Interconnections, and Packaging for VLSI*, Addison-Wesley Publishing Co., Reading, Mass. (1990), page 81, states that "Currently, 50 percent of the total system delay of a high-end computer is due to packaging delays, and the share of packaging may rise to 80 percent of the year 2000."

This places tremendous pressure on package developers to reduce the size of packages in order to minimize adverse effects on system performance. This means that chips must be placed closer together. Moreover, the increasing circuit density of individual chips requires matching increases in interconnect density of packages. Increasing interconnect density forces the down scaling of package features, such as wiring and vias. Down scaling requires increasingly tighter tolerances on the down scaled features.

3. The "Six Sigma" Paradigm

Down scaling comes at a time of increasing business competition, where costs must be kept down while quality and performance are kept high. This means that defect levels must be kept as low as possible. One measure of defect levels is "Six Sigma" engineering and manufacturing. Under the "Six Sigma" paradigm defect levels are kept below 3.4 parts per million. This means that virtually every part, and at least 999,996.6 parts out of every one million parts, must function within specification.

Meeting the demands of the "Six Sigma" paradigm requires a concurrent design and manufacturing engineering that achieves robust product designs and manufacturing processes. The product design must be robust to natural sources of variation, and the manufacturing process must implement process controls that keep manufacturing within specification.

Creation of designs and processes that synergistically interact to meet "Six Sigma" requirements are described, for example, in Mikel J. Harry and Reigle Stewart, *Six Sigma Mechanical Design Tolerancing*, Motorola, Inc., 1988, and incorporated herein by reference. "Six Sigma" is a level of mechanical tolerancing. Mechanical tolerancing is the determination of the zone over which the individual component mechanical parameters of the components in an assembly can fluctuate from the nominal values thereof and still yield an acceptable assembly.

4. Statistical Background

Statistical tolerance analysis is defined by Harry and Stewart to be the computation and subsequent analysis of the mathematical probabilities of exceeding manufacturing specifications. In designing components for manufacturability, mechanical tolerance is related to manufacturing capability.

Tolerancing is based on classical statistics. Thus, every population of components has an arithmetic average or "mean" which is defined by:

$$\mu = \left(\sum_{i=1}^{N} X_i\right)/N$$

where $\mu$ is the arithmetic average or "mean," and a measure of scatter or deviation therefrom or "standard deviation" which is defined by:

$$\sigma = \sum_{i=1}^{N} (X_i - \mu)^2/N$$

where $\sigma$ is the standard deviation, sigma, and $X_i$ is the measurement of the ith component in the assembly.

Figure 1:
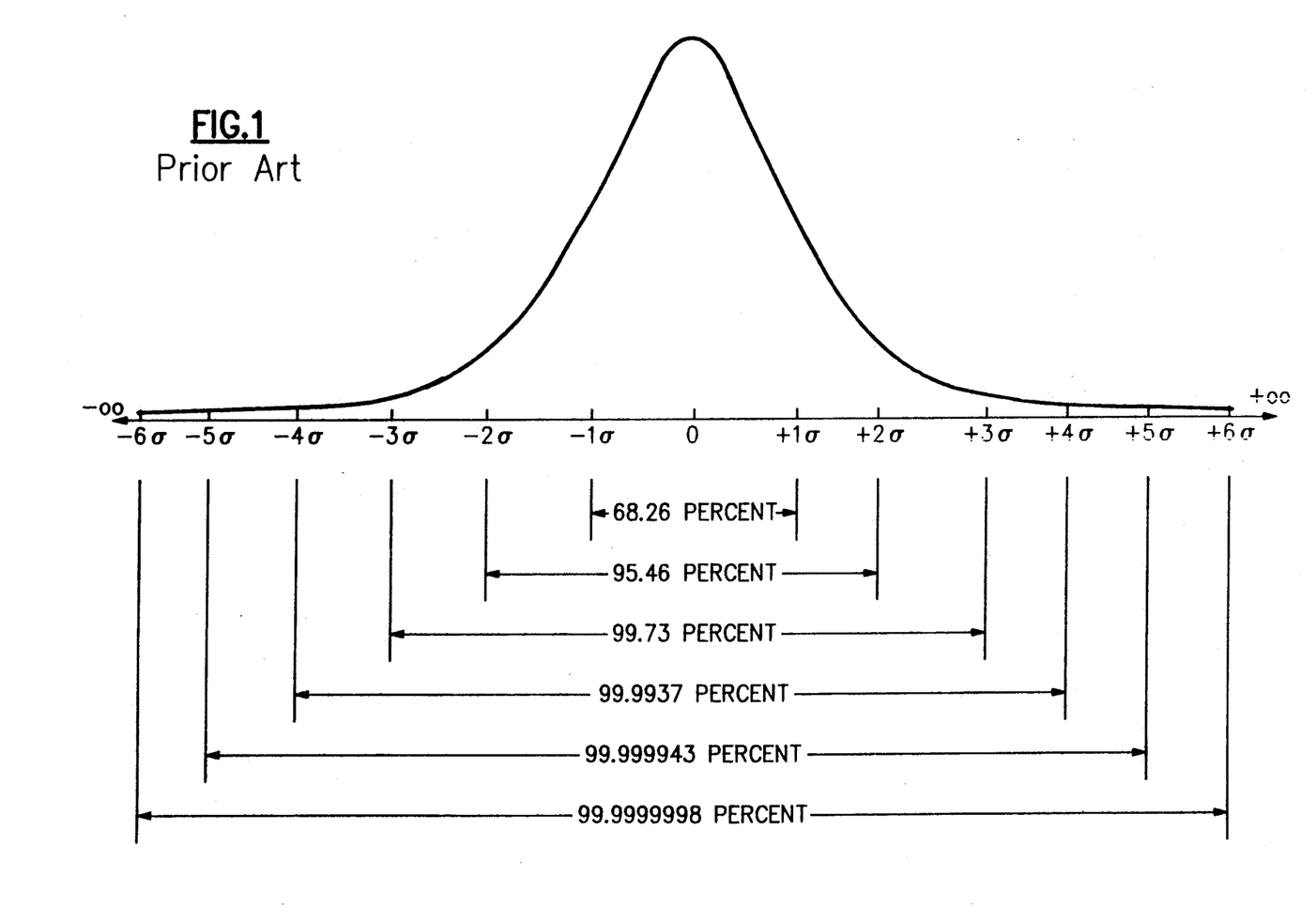
FIG. 1, denominated "Prior Art," is a representation of a normal distribution curve, showing the shape of the curve, the mean, and the area under the curve as a function of "standard deviations" from the mean.

The percentage of a normally distributed population falling within (or beyond) a specified number of standard deviations from the mean is plotted and tabulated in standard reference works. One such plot, from Harry and Stewart, is shown in FIG. 1. This plot shows the population fraction vertically, and the standard deviations, both + and −, outward from the mean, vertically. This plot shows the population fraction vertically, and the standard deviations, both + and −, outward from the mean, vertically. The population between any two standard deviations, $\sigma_1$ and $\sigma_2$, is just the integral of the height, y, between the limits of integration, $\sigma_1$ and $\sigma_2$. Thus, 68.4 percent of a normally distributed population is within +/− one standard deviation of the mean, 95.5 percent of a normally distributed population is within +/− two standard deviations of the mean, and 99.73 percent of a normally distributed population is within +/− three standard deviations of the mean. For a normally distributed population, approximately 3.4 parts per million of the population fall outside of +/−4.5 standard deviations of the mean.

As is shown in FIG. 1, the size range of the 68.4 percent of the population falling within +/−1 standard deviation of the mean is given by:

$$(-1\sigma) \leq X_i \leq (+1\sigma).$$

while the size range of the 68.4 percent of the population falling within +/−2 standard deviations of the mean is given by:

$$(-2\sigma) \leq X_i \leq (+2\sigma).$$

This means that under the "Six Sigma" standard only 3.4 components out of one million fabricated fall outside of the size range given by:

$$(-4.5\sigma) \leq X_i \leq (+4.5\sigma).$$

when the mean is shifted, for example, over time or from production run to production run, by 1.5 standard deviations, and that all of the individual components falling within +/−4.5 standard deviations of the population mean give satisfactory performance.

One performance index used to define the capability of attaining a given mechanical tolerance is the "capability index." This index is defined by:

$$C_p = (USL - LSL)/6\,Sigma$$

where USL and LSL are the upper and lower bounds on a dimension of a part.

Figure 2:
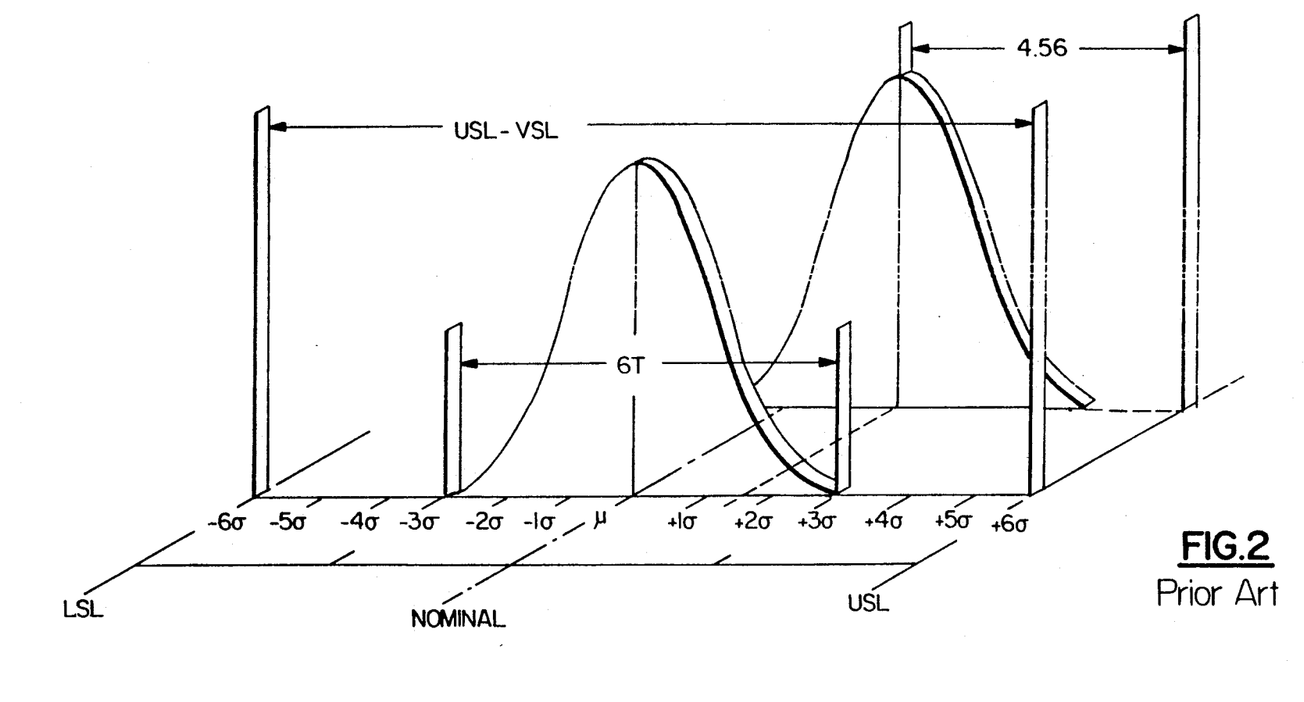
FIG. 2, also denominated "Prior Art," is a representation of two normal distribution curves, one of which shows the mean and distribution for the beginning of a production run, and the other one of which shows the offset or adjustment of the mean and distribution after a production run.

$C_p$ and its defining terms, USL, LSL, and Sigma (standard deviation) are shown in FIG. 2, also from Harry and Stewart. FIG. 2 shows two normal distribution curves, Distribution 1 centered on the nominal specification, and Distribution 2, shifted 1.5 standard deviations from the mean. The upper bound, USL, the lower bound, LSL, and the nominal, , are shown in the FIGURE. The distance USL−LSL and the +/−3 standard deviation spread are shown and identified in FIG. 2.

Consider a population with a capability index, $C_p$, of 2.0. This means that the specification width, USL-LSL, is twice as large as the six sigma distribution range. This means that the maximum manufacturing tolerance for the individual components, from USL to LSL, is twice as wide as the population of the individual components within +/− three standard deviations of the mean. Assuming no change in parameters with production run, this means that six standard deviation standards, i.e., "Six Sigma" standards, will be met for any time invariant process with a capability index, $C_p$, greater then 2.00.

5. Time Variance of the Statistical Measures

It is known that manufacturing process is not time invariant. There is a capability index associated with the time dependence of the the tolerances. This is $C_{pk}$, defined by:

$$C_{pk} = C_p(1-k)$$

where k is defined by $$k = \frac{|\text{Nominal} - \text{Mean}|}{(USL - LSL)/2}.$$

The statistical mean is not constant, but is a variable. Historically, it is throughput dependent. k is a measure of the time or throughput dependent movement of the new mean from nominal. "Six sigma" capability means that even with a significant shift in the statistical mean over the course of a production run, for example a 1.5 standard deviation shift in the mean, the process will still yield only 3.4 unacceptable components per million components manufactured.

Condition 2, "Distribution Average shifted 1.5 Sigma from the Nominal" in FIG. 2 shows the new condition. The mean of the new distribution is offset 1.5 standard deviations to the right, and k is $|1.5\ Sigma|/3\ Sigma$, or 0.5, and $C_{pk}$ is 1.50.

Figure 3:
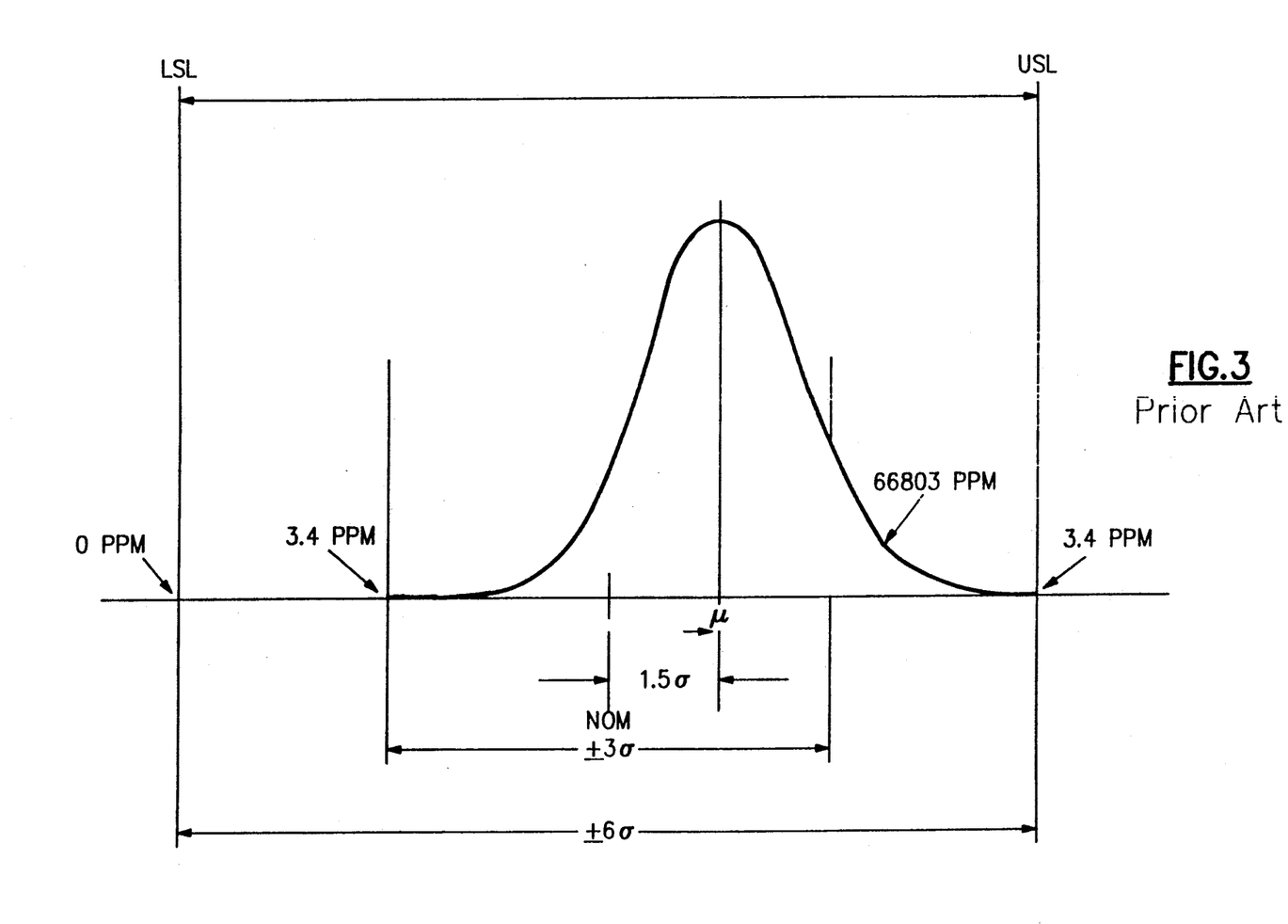
FIG. 3, also denominated "Prior Art," is a representation of the offset or adjusted distribution curve of FIG. 2, showing the offset or adjusted mean and standard deviation.

Referring now to FIG. 3, also from Harry and Stewart, it is seen that even with the offset, the fraction of individual components lying beyond minus six standard deviations from the nominal mean (and beyond 7.5 standard deviations from the offset mean) is effectively zero, and the fraction of individual components lying beyond the six standard deviations from the nominal mean (and beyond 4.5 standard deviations from the offset mean) is 3.4 parts per million. This is the functional equivalent of the Six Sigma capability figure of merit.

6. Assembly Tolerancing

Individual component and feature tolerances must be controlled, as described above, such that final assembly or composite tolerances meet functional requirements to defect levels of less then 3.4 parts per million. Various methods are well known for tolerancing components for final assembly.

a. Worst Case Tolerancing

One such tolerancing method is "Worst Case Tolerancing." In worst case tolerancing, individual components are assumed to be at the extremes of their tolerance range chosen to make the completed assembly non functional. According to the "worst case" model, a set of inserts are assumed to be at their largest sizes within tolerance, and the aperture for receiving them is assumed to be at its smallest size within tolerance, so as to cause the completed assembly to be non-functional and jam.

The worst case model is, in general, too conservative. It leads to needlessly strict specifications which may cause otherwise functional assemblies to be discarded.

The worst case method does not take into consideration the "probabilities" of an interference fit or of excessively large gaps. As noted by Harry and Stewart, worst case analysis merely considers the linear extremes, without regard to process capability.

b. Root-Sum-of-Squares Analysis

In the "Root-Sum-Of-Squares" method, the standard deviation, $\sigma$, the design tolerance, T, and the manufacturing capability, $C_p$ are related through $$\sigma = T/3\ C_p.$$

To be noted is that as the capability, $C_p$ increases relative to the design tolerance, T, the standard deviation, , goes down. This means that as the capability, $C_p$ goes up, there is a lower probability of encountering any given gap interference or constraint.

Root-sum-of-squares analysis, utilizing manufacturing capability, gives a more realistic indication of assembly yield, it does not take into account the offset of the process mean with throughput.

c. Modified Root-Sum-Of-Squares Analysis

The Root-Sum-Of-Squares methods all require modification in order to account for the offset of the individual component mean dimensions with time, e.g., throughput. Various tools are used to relax the time or throughput invariance of the Root-Sum-Of-Squares analysis, and introduce a measure of time or throughput dependence into the Root-Sum-Of-Squares model.

One such tool is the Static Root-Sum-Of-Squares model described by Harry and Stewart. This model makes use of the function k, described above, to multiply the individual component tolerances by a time dependent or throughput dependent function.

This transforms the Root-Sum-Of-Squares model from $$Z_F = \frac{F - \left(N_c - \sum_{i=1}^{m} N_{pi}\right)}{\sqrt{(T_c/3C_{pk})^2 + \sum_{i=1}^{m} (T_{pi}/3C_{pi})^2}}$$

through $$Z_F = \frac{F - \sum_{i=1}^{m} N_i V_i B_i}{\sqrt{\sum_{i=1}^{m} (T_{pi}/3C_{pi})^2}}$$

to $$Z_F = \frac{F - \sum_{i=1}^{m} (N_i + W_i k_i T_i) V_i B_i}{\sqrt{\sum_{i=1}^{m} (T_{pi}/3C_{pi})^2}}$$

where $Z_f$ is the corrected Z transformation of the gap constraint or limitation, $N_e$ and $N_i$ are the nominal dimensions of the aperture and inserts, respectively, $T_c$ and $T_i$ are the design tolerances of the apertures and the inserts, respectively, $C_{pk}$ and $C_{pki}$ are the production capabilities for the aperture and the inserts, respectively, k is as previously defined, and $W_i$ is a shift vector.

d. Root-Sum-Of-Squares Based Models

The modifications to the Root-Sum-Of-Squares based models ultimately lead to a worst case model or a modified worst case model. Thus, it has become necessary to use other tolerancing models.

e. Monte Carlo Analysis

The use of Monte Carlo Analysis in component tolerancing is described in, for example, Mary E. Rowzee and Richard K. Holmes, "Optimizing Component and Assembly Tolerancing," 1986—*ASQC Quality Congress Transactions.*

Monte Carlo analysis is a predictive technique used to determine variation of assemblies based on probabilistic modelling. Monte Carlo analysis is performed by establishing a range for each individual component tolerance, for example a range of USL–LSL. A random sampling fitting a mathematically defined distribution is taken from within this range, and the response evaluated. The output values are analyzed by traditional statistical methods.

Monte Carlo analysis uses a random number generator to perform the distribution sampling. Therefore, Monte Carlo simulation can simulate large sample sizes on digital computers.

Monte Carlo analysis is especially useful where complex assemblies can not be readily or realistically analyzed by linear methods, as root- sum- of -squares analysis or worst case analysis.

Monte Carlo analysis is also useful where the completed assemblies are costly or time consuming to manufacture.

f. Variation Simulation Analysis

Variation simulation analysis is an enhancement to Monte Carlo analysis. It is described in, for example, Mary E. Rowzee and Richard K. Holmes, "Optimizing Component and Assembly Tolerancing," 1986—*ASQC Quality Congress Transactions*, Mark Craig, "Predicting Dimensional Variation In Complex Assemblies," Cadence, July 1989, pp. 59–61, and "Avoiding Assembly Misfits," *Manufacturing Engineering*, June 1990, pp. 53–55.

Examples of variation simulation analysis include incorporation of data analysis methods for distributions other then normal distributions, the creation of tolerance distributions other then normal tolerance distributions, and the ability to incorporate statistical process data. Variation simulation analysis is especially valuable in relating variation and kinematics of component parts of an assembly.

Rowzee et al. also report that tool wear, process deterioration or drifting, dimensional variation from lot to lot, and component variation between suppliers can be taken into account in the design of the assembly. This insight results in tolerances as wide as the design will reasonably permit rather then as narrow as the plant can possibly manufacture.

A further attribute of variation simulation, reported by Rowzee et al., is the incorporation of process capability data information into the assembly design. By this expedient the underlying probability distribution and the degree of dispersion are assessed and incorporated into the simulation model.

Wright reports that the variation simulation analysis module in AutoCAD Release 10 utilizes Monte Carlo analysis to simulate the dimensions of a large number of components for a multi-component assembly, and then "builds" a large number of the multi-component assemblies. The results of the build are then analyzed.

7. Shortcomings of Existing Variation Tolerancing Methods

Many of the existing variation tolerancing methods are strong in analyzing sources of individual component variance and in modelling the individual component variance. Other variation tolerancing methods provide realistic distributions of fit and tolerancing in completed assemblies. However, there is no present method of variation tolerancing that first models time or throughput dependent component variance, and then non-linearly models final assembly tolerances.

OBJECTS OF THE INVENTION

It is a primary object of the invention to analyze sources of individual component variance and model the individual resulting component variance and, using the individual component variance data, model the distributions of fit and tolerancing in completed assemblies.

It is a further object of the invention to analyze the time and through put dependent variation tolerances of the individual components in an assembly, and then non-linearly model final assembly tolerances. By non-linearly modelling is meant using a statistical or probabilistic modelling technique other then a "worst case" or "root-sum-of-squares" type model.

It is still a further object of the invention to use Monte Carlo techniques to analyze and model the time dependent and throughput dependent variation tolerances of the individual components in an assembly, and then use further Monte Carlo analysis to non-linearly model final assembly tolerances.

SUMMARY OF THE INVENTION

These and other objects of the of the invention are obtained by the statistical tolerancing method of the invention. The statistical measures of component features are not time invariant. Such measurements as the means of diameters and the dispersion of individual component diameters about that mean change over a production run or from production run to production run, in a time or throughput dependent way, or even in a random way. According to the method of the invention the mean and the standard deviation of the individual component features are mathematically "shifted" or "adjusted" in a Monte Carlo simulation to account for this change in feature dimensions over time. This results in a shift of the production capability.

According to the invention, these "shifted" or "adjusted" parameters are utilized in a subsequent Monte Carlo simulation to determine discrete values for the individual points of each output distribution, $x(i)$, $y(i)$, $z(i)$. The individual points of the output distributions, $x(i)$, $y(i)$, $z(i)$, are then combined for individual assembly final fit. The statistics of the individual assembly final fits are then compared to manufacturing specifications.

The final fit distribution used in the Monte Carlo simulation for the assembled components is a variable modelled by a function F. F is a function, $F[x,y,z]$, of the dimension distributions of the individual components $x$, $y$, and $z$ in the ith assembly.

The distribution of F is given by Monte Carlo simulation of the function $$F(i) = F[x(i), y(i), z(i)],$$

where the distribution is modelled by direct substitution. That is, the distribution F is modelled by the direct substitution, $$F(1) = F[x(1), y(1), z(1)],$$
$$F(2) = F[x(2), y(2), z(2)],$$
$$\ldots,$$
$$F(i) = F[x(i), y(i), z(i)],$$
$$\ldots, \text{and}$$
$$F(n) = F[x(n), y(n), z(n)].$$

By using the multi-step Monte Carlo method of the invention, it is possible to analyze sources of individual component variance to model the individual resulting component variance and, using the individual component variance data, model the distributions of fit and tolerancing in completed assemblies.

The Monte Carlo method of the invention non-linearly models final assembly tolerances. By non-linearly modelling is meant using a statistical or probabilistic modelling technique, i.e., a Monte Carlo based technique, rather then a "worst case" or "root-sum-of-squares" type model.

The multi-step, multi-Monte Carlo modelling method of the invention utilizes Monte Carlo techniques to first analyze and model the time dependent and throughput dependent variation tolerances of the individual components in an assembly. Then, in a second stage, Monte Carlo analysis is used to randomly select individual components from the set of individual components modelled in the first Monte Carlo simulation and non-linearly model final assembly tolerances.

THE FIGURES

The invention may be more fully understood by reference to the Figures appended hereto.

DETAILED DESCRIPTION OF THE INVENTION

Two Stage Monte-Carlo Simulation With "Shifted" or "Adjusted" Means and Standard Deviations The Monte Carlo tolerancing method of the invention uses capabilities to determine the characteristics of individual components of an assembly. The component characteristics are then combined in a further Monte Carlo simulation step to obtain assembly characteristics.

Component Parameters

The statistical measures of component features are not time invariant. Such measurements as the means of diameters and the dispersion of individual component diameters about that mean change over a production run, in a time or throughput dependent way. According to the method of the invention the mean, the standard deviation, and the production capability of the individual component features are mathematically "shifted" or "adjusted" in a Monte Carlo simulation to account for this change in feature dimensions over time.

Assembly Parameters

According to the invention, these "shifted" or "adjusted" parameters are utilized in a subsequent Monte Carlo simulation to determine discrete values for the individual points of each output distribution, x(i), y(i), z(i). The individual points of the output distributions, x(i), y(i), z(i), are then combined for individual assembly final fit. The statistics of the individual assembly final fits are then compared to manufacturing specifications.

The final fit distribution used in the Monte Carlo simulation for the assembled components is a variable modelled by a function F. F is a function, $F[x,y,z]$, of the dimension distributions of the individual components x, y, and z in the ith assembly.

The distribution of F is given by Monte Carlo simulation of the function $$F(i) = F[x(i), y(i), z(i)].$$

where the distribution is modelled by direct substitution. That is, the distribution F is modelled by the direct substitution, $$F(1) = F[x(1), y(1), z(1)].$$
$$F(2) = F[x(2), y(2), z(2)].$$
$$\ldots$$
$$F(i) = F[x(i), y(i), z(i)].$$
$$\ldots, \text{and}$$
$$F(n) = F[x(n), y(n), z(n)].$$

The values of the individual component parameters x, y, and z, and for individual sampled values thereof, x(i), y(i), z(i) make use of the adjusted mean and the adjusted standard deviation. The calculation of the individual component adjusted mean and adjusted standard deviation was described in the Background of The Invention.

Dynamic Mean Shift

As described above, the dynamic mean shift, utilized in the Dynamic Root Sum of Squares method, accounts for random and throughput dependent variation by adjusting the standard deviation as follows:

$$\mu_{adj} = (USL - LSL)/6C_{pk}$$

where $\mu_{adj}$ is the adjusted standard deviation, and USL and LSL are the upper and lower limits of the distribution as described previously.

The adjusted mean is equal to the nominal value:

$$\mu_{adj} = Nominal = (USL + LSL)/2$$

where $\mu_{adj}$ is the adjusted mean and USL and LSL are as described above.

This increases the spread of the distribution to account for variations, e.g., random variations and throughput dependent variations, in the process mean.

Static Mean Shift

By way of contrast, the static mean shift can also be adapted from Harry and Stewart to work in the Monte Carlo environment. The static mean shift accounts for throughput dependent shifts and offsets by adjusting the mean:

$$\mu_{adj} = Nominal + [V(C_p - C_{pk})(USL - LSL)]/2C_p$$

where V is a shift vector that indicates the direction of the mean shift. The standard deviation is then calculated by:

$$\mu_{adj} = (USL - LSL)/6C_p.$$

In the static mean shift the location of the distribution is shifted to account for the sustained mean shift.

Generation of Individual Component Distributions

In either method the adjusted standard deviation and the adjusted mean are used to generate a random normal distribution for each input variable. This is done using an established distribution generator routine.

Generation of Assembly Distributions

The model equations that describe the relationships between the input and the output variables are used to calculate discrete values for each output distribution.

Psuedo Code

The following example of psuedo-code is exemplary of methodology for calculating the output variables:

```
for each Input_Variable
    if Type = DYNAMIC then
        Mean = (USL + LSL)/2
        Std_Dev = (USL - LSL)/6C_pk
    end-if
    if Type = STATIC then
        Mean = [(USL+LSL)/2][1 + V(1 - C_p/C_pk)]
        Std_Dev = (USL - LSL)/6C_p
    end-if
    for i = 1 to Sample_Size
        Generate a standard normal deviate(Z)
        Input_Variable[i] = Mean + Z * Std_Dev
    end-for
for each Model_Equation
    for i = 1 to Sample_Size
        Evaluate the model equation
    end-for
end-for
for each Output_Variable
    Calculate Mean, Std_Dev, C_p, C_pk, and
        estimate of fraction defective
end-for
```

In the pseudo-code above, the input variables are:

| | |
|---|---|
| $C_p$ | The process capability for each input variable. |
| $C_{pk}$ | The process capability for each input variable which takes into account sources of variation which cause the mean to vary from the nominal value. |
| LSL | The lower limit of the distribution for the input variable. |
| USL | The upper limit of the distribution for each input variable. |
| Type | For each input variable, Type indicates whether the distribution mean shift is "Dynamic" or "Static." |
| Vector | The Vector, for a static shift, determines whether the mean is shifted in the positive (Vector = 1) or negative (Vector = −1) direction. |
| Model_Equation | For each model equation, the character string which represents the equation. These equations are used as input to the Expression_Evaluator. |
| Sample_Size | The size of the sample to be generated for each variable. |

The output variables are:

| | |
|---|---|
| Input_Variable | For each input variable, an array of real values to hold the sample points that are generated. |
| Output_Variable | For each output variable, ar array of real values to hold the sample points which are generated. |

The following local variables are used in the pseudo code:

| | |
|---|---|
| i | A for-loop counter. |
| Z | Holds the value of the randomly generated standard normal deviate upon return from the Standard_Normal_Deviate_Generator Routine. |
| Mean | The mean of the distribution which is calculated based on the distribution limits, process capabilities, and type of distribution (static or dynamic). |
| Std_Dev | The standard deviation of the distribution which is calculated based on the distribution limits, process capabilities, and type of distribution (static or dynamic). |

The method described by the above pseudo code utilizes two standard routines. One routine is a standard normal deviate generator, and the other is an expression evaluator.

For the standard normal deviate generator, each call to this routine produces a randomly generated value which is mapped into the standard distribution. By a standard normal distribution is meant a Gaussian distribution with the mean equal to zero and the standard normal deviation equal to one. It is, of course, to be understood that other distributions may be utilized with other generators in the Monte Carlo method of the invention.

The expression evaluator produces the results of the calculations specified by the algebraic equation in the call. The Monte Carlo method of the invention works independently of the choice of the expression evaluator.

Particularly to be note in the psuedo code is that the Monte Carlo simulation is a two stage simulation, with a first stage evaluating the distribution of the component characteristics, i.e., x(i), y(i), and z(i) in the earlier discussion, and a second stage evaluating the assembly characteristics, F(x(i), y(i), z(i)), in the earlier discussion.

The first stage of the Monte Carlo simulation includes the loops:

```
for each Input_Variable
    if Type = DYNAMIC then
        Mean = (USL + LSL)/2
        Std_Dev = (USL - LSL)/6C_pk
```

```
end-if
if Type = STATIC then
    Mean = [(USL+LSL)/2][1+V(1-C_p/C_pk)]
    Std_Dev = (USL - LSL)/6C_p
end-if
for i= 1 to Sample_Size
    Generate a standard normal deviate(Z)
    Input_Variable[i] = Mean + Z * Std_Dev
end-for
``` while the second stage of the Monte Carlo simulation includes the loops:

```
end-for
for each Model_Equation
    for i= 1 to Sample_Size
        Evaluate the model equation
    end-for
end-for
``` with the results reported by the loop:

```
for each Output_Variable
    Calculate Mean, Std_Dev, C_p, C_pk, and
        estimate of fraction defective
end-for
```

Process Description

The two stage Monte Carlo fabrication tolerancing method of the invention is particularly useful in fabricating multi-component assemblies having insert components x, y, and z. The insert components may be meshing gears, for example planetary gears. Alternatively, the insert components may be integrated circuit chip pins to be inserted in a surface mount device, or pads on an integrated circuit chip to bonded to facing pads on a circuit card or board.

The insert components are to be installed, inserted, bonded, or joined to within a pre-set fabrication fit tolerance, $F(x,y,z,)$. Each of said insert components, x, y, z, has fit determining parameters. That is, the interaction of the parameters determines if there will be proper fit, mechanical interference, or too large of a gap. The fit determining parameters of the set of insert components have a distribution of values about a mean value.

According to the method of the invention Monte Carlo simulation is used over a set of n individual insert components of each type of insert component, x, y, z, in the sample space. That is, for each insert component, x, z, and z, for i=1 to the sample size, n, Monte Carlo simulation is used to generate a statistical distribution of each fit determining parameter. The distributions have a mean and a deviation about the mean, between manufacturing capability defined lower and upper limits, for each of the fit determining parameters of the individual insert components, x,y,z.

Each set of the fit determining parameters of the individual inserts are appropriately combined to generate a fit tolerances, $F(x, y, z)$, of the multi-component assembly. This is done by inputting the numerical value of each appropriate fit determining parameter for each individual insert component in the ith set of individual insert components, $x(i)$, $y(i)$, $z(i)$, into a suitable model. This model may be a three dimensional CAD/CAM model. The model of the ith assembly is then used to determine the fabrication fit tolerance, $F(x(i), y(i), z(n))$, of the ith set of individual insert components, $x(i)$, $y(i)$, and $z(i)$, in the ith individual multi-component assembly. This determination is based upon combining into the ith assembly the individual parameters of the ith set of individual components, $x(i)$, $y(i)$, $z(i)$, determined by Monte Carlo simulation.

The counter, i, is then incremented, and the Monte Carlo simulation is repeated for each set of individual insert components, $x(i)$, $y(i)$, $z(i)$, and each assembly in the sample space. The results of the Monte Carlo simulation are used to determine the fraction of the tolerances, $F(x,y,z)$ of the the set of n multi-component assemblies falling between suitably defined lower and upper limits.

The statistical distribution of the fit tolerances of the set of n multi-component assemblies may then be used to set component manufacturing tolerances or to redesign the assembly or individual components of the assembly.

EXAMPLES

The two stage Monte Carlo simulation method of the invention may be understood by the two examples described herein below:

Example I

Figure 4:
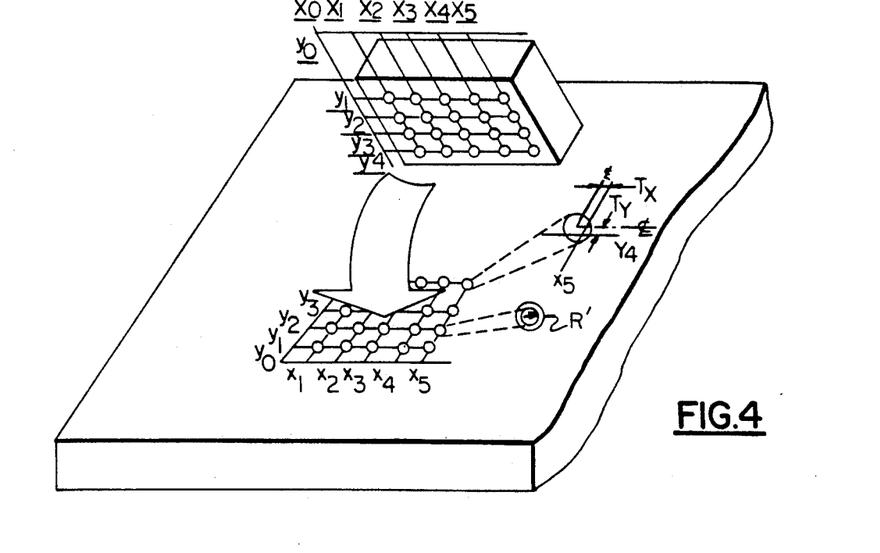
FIG. 4 shows an integrated circuit chip and a microelectronic circuit package used to illustrate the tolerancing method of the invention, with solder pads, a pair of x-y grids for locating the solder pads, and identification of variables subject to tolerancing.

The measurements of a micro-electronic circuit package 1, including a substrate 11 and an integrated circuit chip 31 are shown in FIG. 4. FIG. 4 also shows the solder pads 13 on the substrate 11, and the solder balls 33 on the integrated circuit chip 31, along with a pair of x-y grids for locating the solder pads 13 and solder balls 33. These features are used to represent the variables subject to tolerancing.

As shown in FIG. 4, each solder pad 13 has a unique address with x co-ordinates $[x(i)_1, x(i)_2, x(i)_3, x(i)_4, x(i)_5]$ and y co-ordinates $[y(i)_1, y(i)_2, y(i)_3, y(i)_4, y(i)_5]$. Likewise, each solder ball 33 has a unique address with x co-ordinates $[x(i)_1, x(i)_2, x(i)_3, x(i)_4, x(i)_5]$ and y co-ordinates $[y(i)_1, y(i)_2, y(i)_3, y(i)_4, y(i)_5]$.

As further shown in FIG. 4, the actual location of the center of a solder pad 13 may be offset from the nominal by an amount $Tx_n(i)=x'_n(i) - x_n$ in the x direction and $Ty_n(i)=y'_n(i)-y_n$ in the y direction. Similarly, the actual size of the solder pad may vary from nominal by an amount $R'$.

In the same way, the actual location of a solder ball 33 may be offset from the nominal by an amount $Tx_n(i)=x'_n(i)-x_n$ in the x direction and $Ty_n(i)=y'_n(i)-y_n$ in the y direction.

By geometric arguments the misalignment at the ith solder pad 13 - solder ball 33 pair is given by:

$$[(Tx(i)_n - Tx(i)_n)^2 + (Ty(i)_n - Ty(i)_n)^2]^{\frac{1}{2}},$$

where the values of the offsets are determined and combined by the two-stage Monte Carlo simulation as described hereinabove. That is, the values of the solder pad 13 offsets $Tx(i)_n$ and $Ty(i)_n$ are determined in one simulation, the values of the solder ball 33 offsets $Tx(i)_n$ and $Ty(i)_n$ are determined in another Monte Carlo simulation, and the values are combined as above for the ith solder pad- solder ball pair in a further Monte Carlo simulation.

Example II

Figure 5:
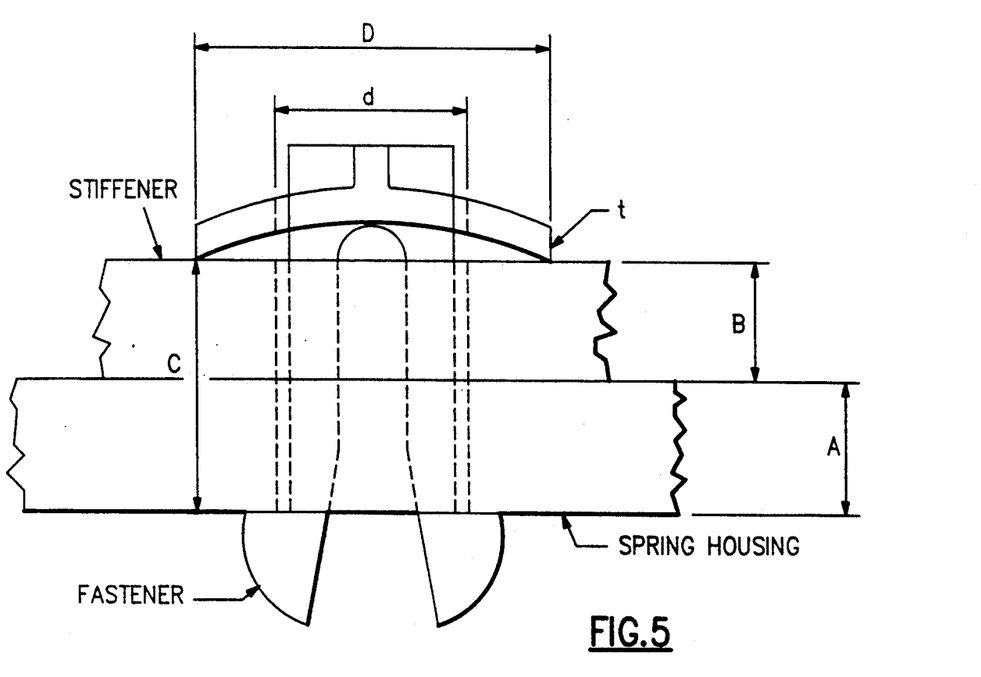
FIG. 5 shows a cross section of a fastener/connector housing assembly used to illustrate the tolerancing method of the invention.

FIGS. 5, 6, 7, and 8 illustrate an electronic circuit packaging application of the method of the instant invention. A self locking fastener is shown in FIG. 5. The fastener contains an integral spring washer which provides a clamping force. When assembled the fastener must provide a clamping force of 4.448 Newtons (1 pound) to the assembly. The fastener is made of molded plastic, and the spring washer is selected to accommodate the upper limits of the housing and fastener. The function of the spring washer is to insure latching when a short fastener is mated to a thick assembly.

As a first approximation, the force generated by the spring washer for a given deflection is given by:

$$P = \frac{4Et^3f(D-d)}{D^3}$$

where $f=(A+B)-C$, P is the clamping force, E is the modulus of the fastener material, t is the thickness of the washer, D is the outer diameter of the washer, d is the inner diameter of the washer, C is the distance from the washer to the latch point, A is the thickness of the spring housing, and B is the thickness of the circuit board stiffener.

Figure 6:
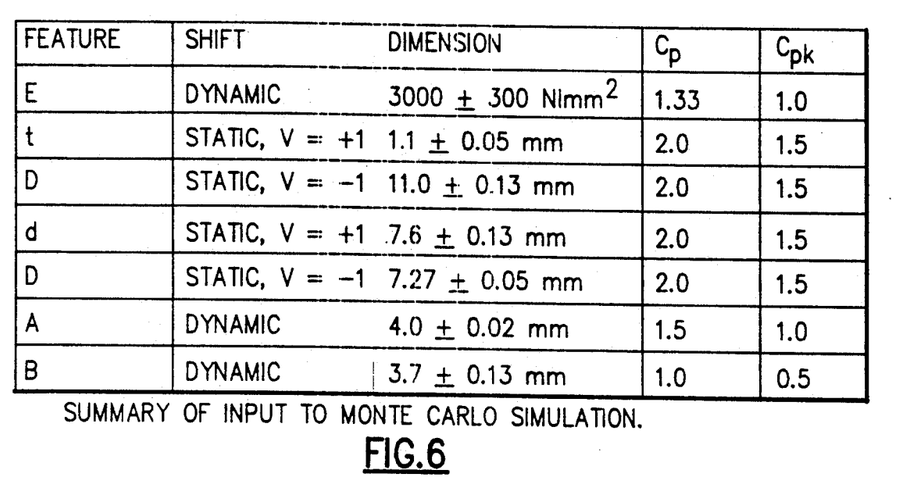
FIG. 6 shows the summary of inputs to the Monte Carlo analysis method of the invention to analyze the fastener/connector of FIG. 5.
Figure 7:
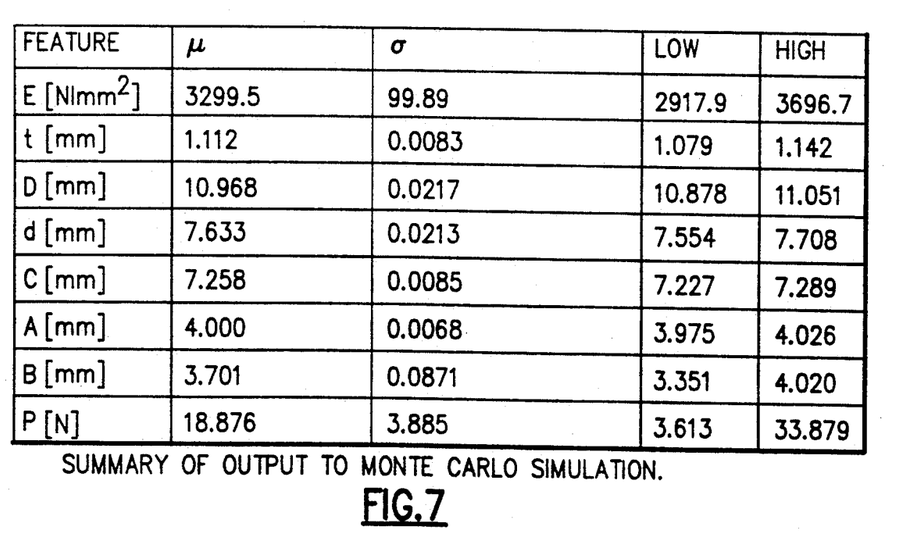
FIG. 7 shows the summary of the output from the Monte Carlo simulation of the fastener/connector of FIG. 5.
Figure 8:
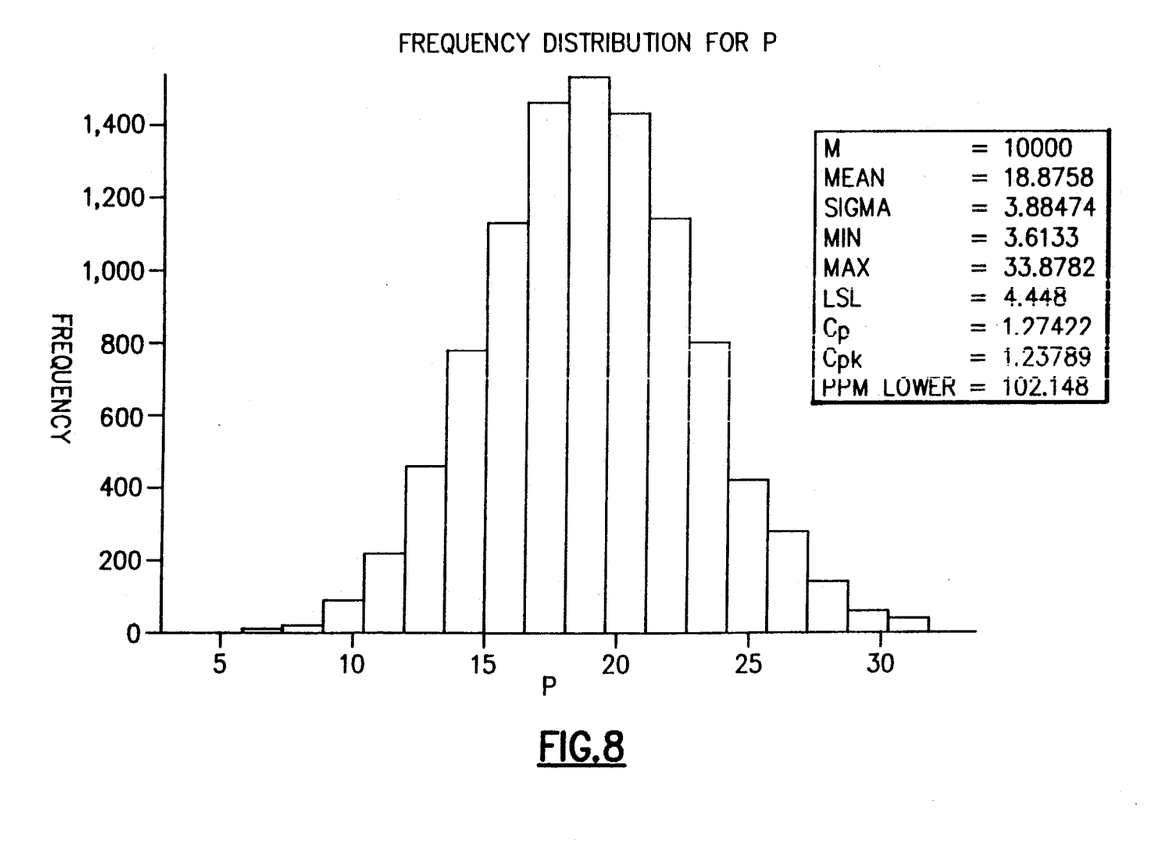
FIG. 8 shows a histogram of the distribution of the spring washer clamping force for the fastener/connector of FIG. 5.

The limits and capabilities of each dimension are shown in FIG. 6. The Monte Carlo method described herein is then used for ten thousand cases. The results are shown in FIG. 7, and a histogram of the clamping force pressure is shown in FIG. 8. These results show that the clamping force capabilities are $C_p = 1.274$ and $C_{pk} = 1.238$. These results fall far short of the "Six Sigma" requirement of $C_p \geq 2.0$ and $C_{pk} \geq 1.5$. The defect level is 102 parts per million, which is far in excess of the "Six Sigma" defect level of 3.4 parts per million. The method of the invention shows that tighter tolerances must be maintained in the manufacture of the components.

Utility of Two Stage Monte Carlo Tolerancing

The multi-step method of the invention may be used as a separate and free standing tolerancing tool. Alternatively, it may be incorporated into another system, as a CAD/CAM system, a CIM (Computer Integrated Manufacturing) system.

The method of the invention can be used to tolerance characteristics and parameters other than geometric characteristics and parameters, as is shown in Example 2 above, where two stage Monte Carlo simulation is used to tolerance elastic characteristics. Thus, the method of the invention may be used for tolerancing thermal fit, eleastic fit, electrical fit, or even digital fit parameters of a system, such as mechanical fit parameters of components of an assembly, or the resistances, capacitances, and inductances of circuit elements, or even the speeds of the memory chips in a memory.

By using the multi-step Monte Carlo method of the invention, it is possible to analyze sources of individual component variance to model the individual resulting component variance and, using the individual component variance data, model the distributions of fit and tolerancing in completed assemblies.

The Monte Carlo method of the invention non-linearly models final assembly tolerances. By non-linearly modelling is meant using a statistical or probabilistic modelling technique, i.e., a Monte Carlo based technique, rather then a "worst case" or "root-sum-of-squares" type model.

The multi-step, multi-Monte Carlo modelling method of the invention utilizes Monte Carlo techniques to first analyze and model the time dependent and throughput dependent variation tolerances of the individual components in an assembly. Then, in a second stage, Monte Carlo analysis is used to randomly select individual components from the set of individual components modelled in the first Monte Carlo simulation and non-linearly model final assembly tolerances.

While the invention has been described with respect to certain preferred embodiments and exemplifications, it is not intended to limit the scope of the invention thereby, but solely by the claims appended hereto.

We claim:

1. A method of fabricating a multi-component assembly having components x, y, and z, to within a pre-set tolerance, F(x,y,z), each of said components, x,y,z, having parameters with a distribution of values thereof, said method comprising:
   a. generating by Monte Carlo simulation over the n individual components of each type, x, y, z, in the sample space, for i=1 to the sample size, n,
   (1) a mean,
   (2) a shifted, time variant mean, chosen from the group consisting of:
   i. the dynamic mean shift, $$\mu_{adj} = (USL - LSL)/6C_{pk}.$$

ii. the static mean shift, $$\mu_{adj} = Nominal + [V(C_p - C_{pk})(USL - LSL)]/2C_p$$

where
   Nominal is the time invariant mean, $C_{pk} = C_p(1-k)$, $C_p = (USL - LSL)/(6\text{ Sigma})$,
   $k = |Nominal - Mean|/[(USL - LSL)/2]$, $\mu_{adj}$ is the adjusted standard deviation, and USL and LSL are the upper and lower limits of the distribution, V is a shift vector that indicates the direction of the mean shift; and
   (3) a deviation about the shifted, time variant mean, of each of the parameters of the individual components, x,y,z, between a lower limit thereof and an upper limit thereof, to determine the statistical distributions of the parameters of the ith sets of the individual components, x(i), y(i), and z(i); and
   b. generating a set of tolerances, F(x, y, z), of the multi-component assemblies by inputting for each individual component in the ith set of individual components, x(i), y(i), z(i), the parameters thereof, and thereafter for the ith assembly determining the fabrication tolerance, F(x(i), y(i), z(n)), of the ith set of individual components, x(i), y(i), and z(i), in the ith individual multi-component assembly based upon combining into the ith assembly said distributed parameters of the ith set of individual components, x(i), y(i), z(i), determined by Monte Carlo simulation,
   c. incrementing i and repeating steps (a) and (b) for each set of individual components, x(i), y(i), z(i), and each assembly in the sample space;
   d. thereafter determining the fraction of the tolerances of the set of n multi-component assemblies falling between a lower limit thereof and an upper limit thereof to determine the statistical distribution of the tolerances of the set of multi-component assemblies; and
   e. redesigning individual components of the multi-component assembly to increase the fraction of the fabrication fit tolerances of the multi-component assemblies falling between a lower limit thereof and an upper limit thereof; and fabricating the multicomponent assembly.

2. The method of claim 1 wherein the parameters are chosen from the group consisting of mechanical fit parameters, mechanical property parameters, electrical parameters, and digital parameters.

* * * * *